United States Patent [19]

Zabron et al.

[11] Patent Number: 5,586,643
[45] Date of Patent: Dec. 24, 1996

[54] MODULAR BELTING HAVING ANTIMICROBIAL CHARACTERISTICS AND METHOD OF MANUFACTURE

[75] Inventors: Florian S. Zabron, Orchard Park; Mary E. Marlette, Snyder; Miles S. Rothman, Williamsville, all of N.Y.; William D. Hanrahan, Charlotte, N.C.

[73] Assignee: Globe International Inc., Buffalo, N.Y.

[21] Appl. No.: 444,738

[22] Filed: May 19, 1995

[51] Int. Cl.⁶ .................................................. B65G 17/06
[52] U.S. Cl. .................................................. 198/853
[58] Field of Search ................................. 198/850, 851, 198/852, 853

[56] References Cited

U.S. PATENT DOCUMENTS

| | | | |
|---|---|---|---|
| 4,159,763 | 7/1979 | Kewley et al. | 195/853 |
| 4,688,670 | 8/1987 | LaPeyre | 198/853 |
| 4,787,516 | 11/1988 | Morrison | 206/566 |
| 5,020,656 | 6/1991 | Faulkner | 198/853 X |
| 5,069,907 | 12/1991 | Mixon et al. | 424/445 |
| 5,238,749 | 8/1993 | Cueman et al. | 428/441 |
| 5,303,818 | 4/1994 | Gruettner et al. | 198/853 X |
| 5,332,084 | 7/1994 | Greve | 198/853 |

OTHER PUBLICATIONS

Microban Custom Designed Applications For The Textile Industry.

*Primary Examiner*—James R. Bidwell
*Attorney, Agent, or Firm*—Hodgson, Russ, Andrews, Woods & Goodyear, LLP

[57] ABSTRACT

A conveyor belting comprising a plurality of like modules having a broad spectrum antimicrobial agent associated therewith, is described. The modules are of an integral molded construction and the antimicrobial agent is preferably a chlorinated phenoxy incorporated into the polymeric material comprising the modules. The belting of the present invention is particularly useful for conveying and transporting foods including food processing and food handling applications.

13 Claims, 4 Drawing Sheets

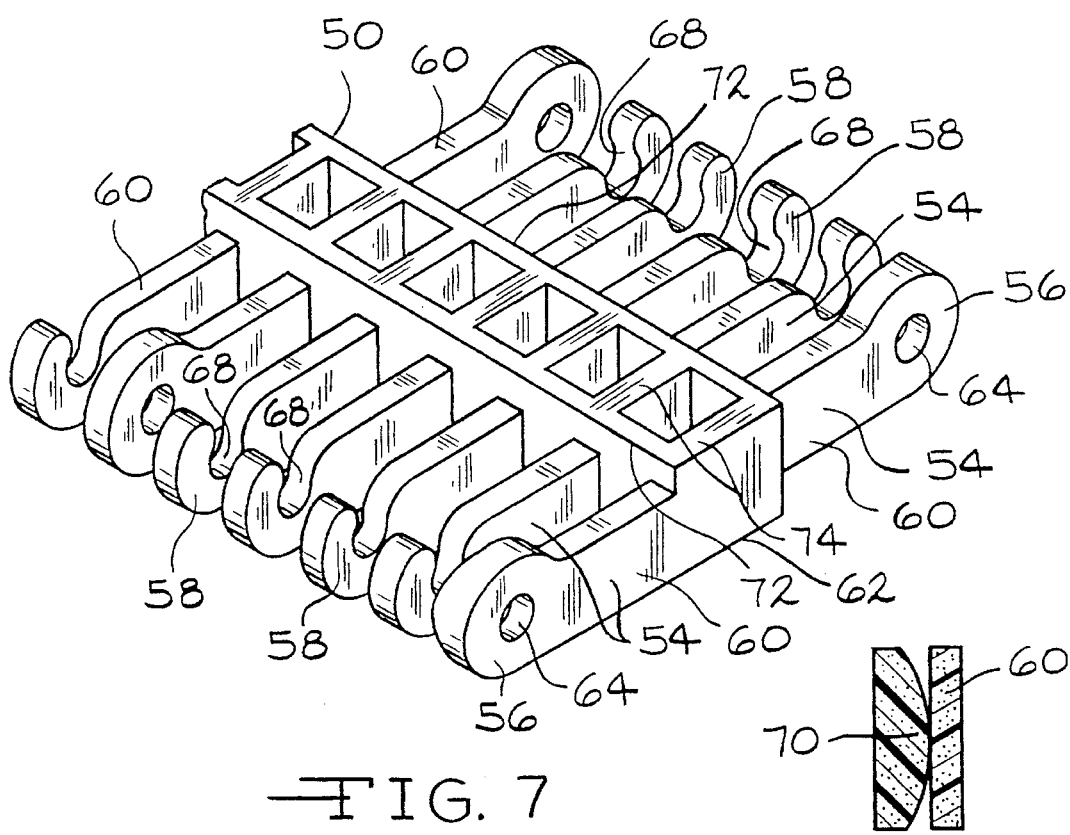
FIG. 7
FIG. 6A
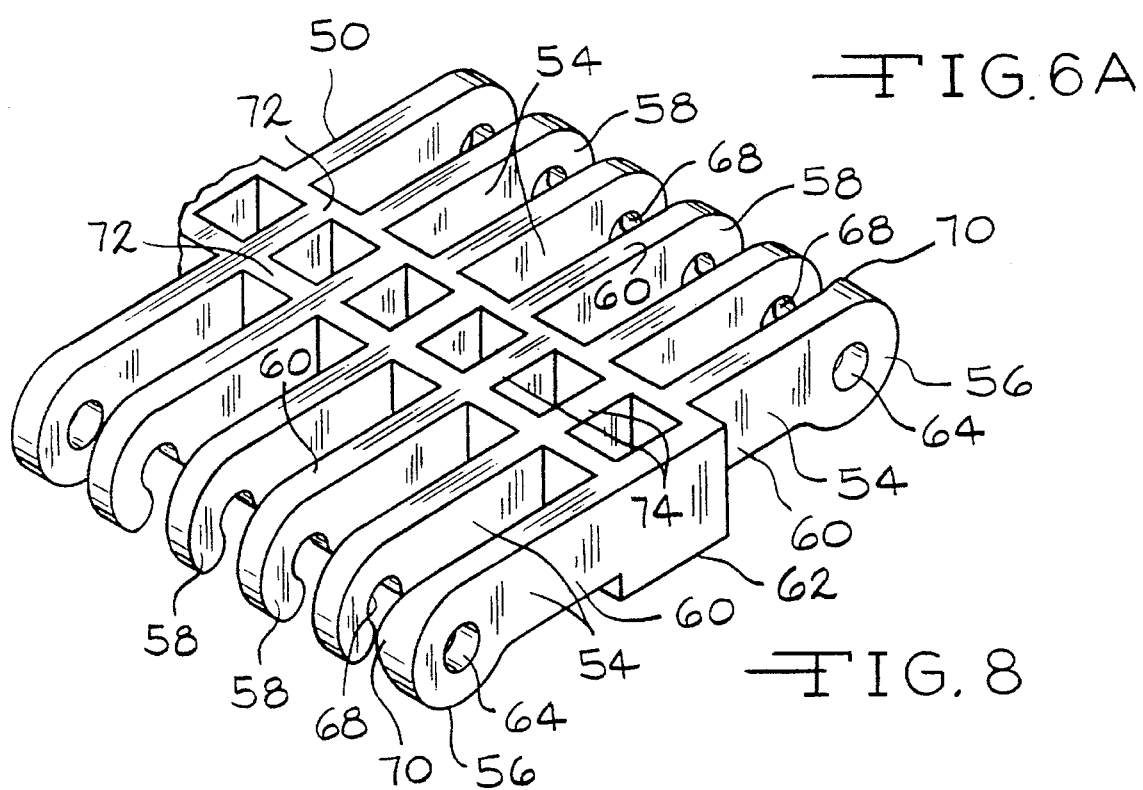
FIG. 8

MODULAR BELTING HAVING ANTIMICROBIAL CHARACTERISTICS AND METHOD OF MANUFACTURE

BACKGROUND OF THE INVENTION

1. Field of the Invention

The present invention relates to beltings and more particularly to a modular conveyor belting comprising interconnected modules of a similar integral construction. The modules comprising the conveyor belting preferably include a broad spectrum antimicrobial agent associated therewith to inhibit bacterial growth and promote asepsis on the belting.

2. Prior Art

Modular conveyor belting is well known. For quality control purposes in the food industry it is desirable that the conveyor be readily inspected to assure cleanliness. Government and industry regulations also specify standards of inspection and cleanliness for equipment used in processing products for human consumption. There is, therefore, a need for a belting have associated therewith an antimicrobial agent that inhibits bacterial growth and promotes asepsis on the belting through extended wear, and that is safe for human contact. The antimicrobial agent needs to be free of heavy metals, carcinogenic substances and any agents that are both harmful to the environment and are not suitable for human ingestion. As will be explained in detail presently, the conveyor belting of the present invention having the antimicrobial agent associated therewith meets these criteria.

The antimicrobial agent of the present invention has previously been provided as an additive incorporated into the elastomeric material in a pierced earring stand to disinfect the earring wires during storage (U.S. Pat. No. 4,787,516 to Morrison); as a coating for metallic and non-metallic solid substrates (U.S. Pat. No. 5,238,749 to Cueman et al.); and as a material incorporated into a surgical drape (U.S. Pat. No. 5,069,907 to Mixon et al.). The disclosure of these patents are incorporated herein by reference. However, none of these prior art patents discloses the use of the present antimicrobial agent associated with a conveyor belting, and in particular with a modular conveyor belting.

SUMMARY OF THE INVENTION

The present invention relates to a modular conveyor belting having antimicrobial characteristics that inhibit bacterial growth and promote asepsis on the belting, which comprises: a plurality of like modules, each module comprised of a polymeric material and including a first plurality of link ends, a second plurality of link ends and an intermediate section integrally formed with and joining the first and second plurality of link ends, wherein the link ends of each of the modules are releasably engaged between link ends of an adjacent module except for individual link ends disposed at the extreme sides of the module; a pivot rod for pivotally connecting the modules at engaged link ends, wherein the link ends of each of the modules are of a width somewhat less than the spacing between confronting link ends along the pivotal axis thereof to provide for the pivotal connection of the modules; and an antimicrobial agent associated with the modules, wherein the antimicrobial agent is provided as a topical applicant applied to an exposed surface of the module or is incorporated into the polymeric material thereof, wherein the antimicrobial agent is selected from the group consisting of a chlorinated phenoxy and polyhexamethylene biguanide hydrochloride, and wherein when the antimicrobial agent is incorporated into the polymeric material comprising the modules, the antimicrobial agent exhibits controlled migration through the polymeric material to the exposed surface thereof when an imbalance of vapor pressure of the antimicrobial agent demands equalization to thereby continuously inhibit bacterial growth and promote asepsis on the belting.

Further, the present invention relates to a method of manufacturing a modular conveyor having antimicrobial characteristics that inhibit bacterial growth and promote asepsis on the belting, which comprises: providing a plurality of like modules, each comprising a polymeric material and including a first plurality of link ends, a second plurality of link ends and an intermediate section integrally formed with and joining the first and second plurality of link ends, wherein the link ends of each of the modules are releasably engaged between link ends of an adjacent module except for individual link ends disposed at the extreme sides of the module; providing a pivot rod for pivotally connecting the modules at engaged link ends, wherein the link ends of each of the modules are of a width somewhat less than the spacing between confronting link ends along the pivotal axis thereof to provide for the pivotal connection of the modules; associating an antimicrobial agent with the modules by applying the antimicrobial agent to the modules as a topical applicant to an exposed surface thereof or by incorporating the antimicrobial agent into the polymeric material thereof; selecting the antimicrobial agent from the group consisting of a chlorinated phenoxy and polyhexamethylene biguanide hydrochloride, wherein when the antimicrobial agent is incorporated into the polymeric material, the antimicrobial agent exhibits controlled migration through the polymeric material comprising the modules to the exposed surface thereof when an imbalance of vapor pressure of the antimicrobial agent demands equalization thereby continuously inhibiting bacterial growth and promoting asepsis on the belting.

These and other aspects of the present invention will become more apparent to those of ordinary skill in the art by reference to the following description and to the appended drawings.

BRIEF DESCRIPTION OF THE DRAWING

FIG. 6A is a cross-sectional view along line 6A—6A of FIG. 6.

FIG. 7 is an upside down a perspective view of one module 50 comprising the belting 52 shown in FIGS. 5 and 6.

FIG. 8 is a perspective view of the module 50 shown in FIG. 7.

DETAILED DESCRIPTION OF THE INVENTION

Figure 1:
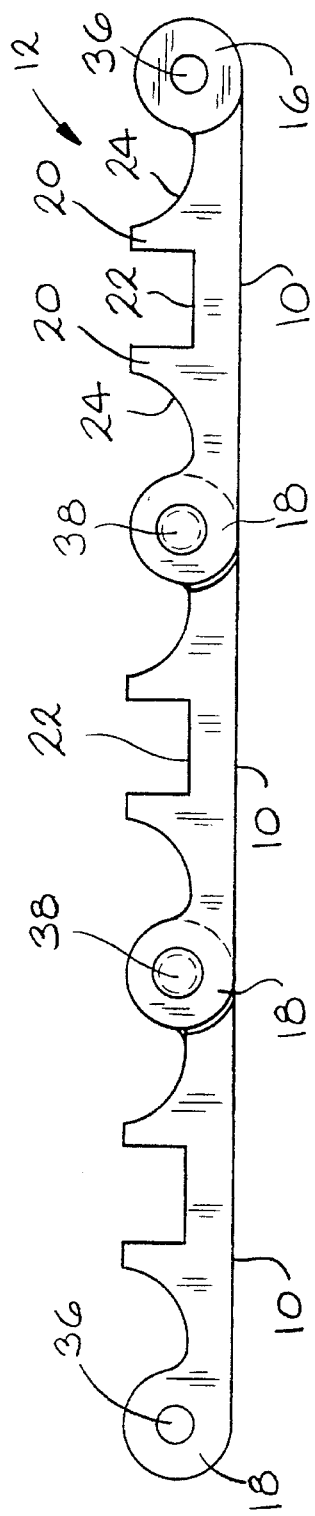
FIG. 1 is an upside down side elevation view of a modular conveyor belting 12 constructed according to the present invention.

Referring now to the drawings, there is shown in FIGS. 1 to 4 an exemplary module 10 according to one embodiment of the present invention. The module 10 preferably includes a broad spectrum antimicrobial agent associated therewith to inhibit bacterial growth and promote asepsis on the module 10. The module 10 is interconnected with like modules to form a modular linked conveyor belting 12. Each module 10 is an integral unitary structure of polymeric material, preferably having the antimicrobial agent incorporated therein, and is formed in an injection molding or other molding process. Each module 10 includes a generally rectangular plate-like body 14 having a first plurality of link ends 16 and a second plurality of link ends 18. A pair of transverse ribs 20 extend across the width of the underside of the body to form an intermediate channel 22 with opposed concavely curved under surfaces 24 extending from each transverse rib 20 and terminating at edges 26 and 28 from which respective link ends 16 and 18 project. The channel 22 is adapted to mate with corresponding sprocket teeth of a sprocket wheel (not shown) to impart a driving force to the conveyor belt 12 formed by the interconnected modules 10. The under structure of the module 10 formed by the transverse ribs 20 and the curved surfaces 24 serves to strengthen the module and to prevent any significant binding of the module 10 about its longitudinal or transverse axes.

The link ends 16 and 18 each have upper surface portions 30 (FIG. 3) coplanar with an upper conveyor surface 32 of the body 14, and a rounded portion 34 which curves from the upper surface 30 and joins the curved under surface 24 to circumscribe corresponding ones of aligned openings 36. The openings 36 receive pivot pins or rods 38 adapted to pivotally connect the modules in an end to end configuration while laterally aligning adjacent modules. The rods 38 are preferably preformed with a head on one end, the other end of the rod being headed such as by heating after insertion of the rod 38 through the openings 36 of interconnected modules 10.

Figure 2:
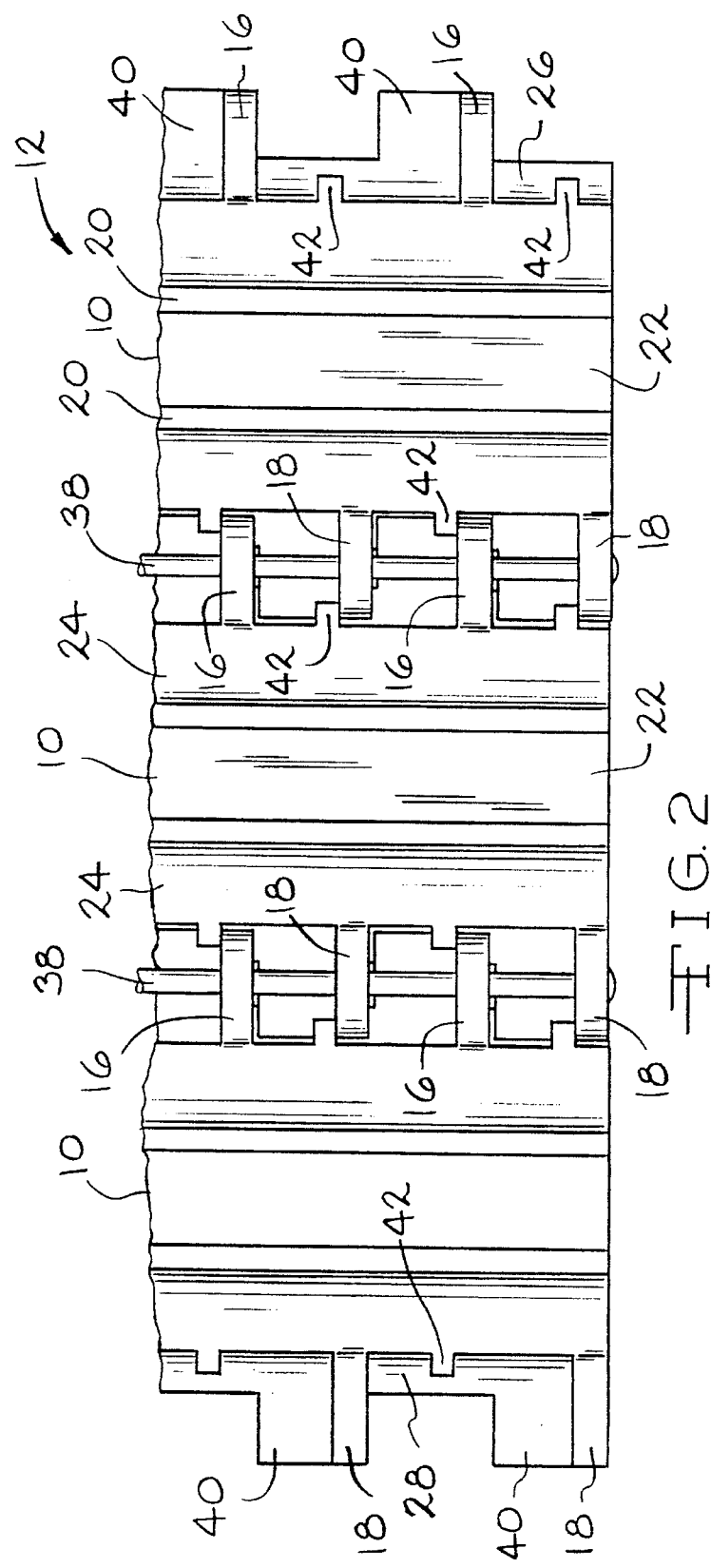
FIG. 2 is an underside plan view of the modular conveyor belting 12 shown in FIG. 1.
Figure 3:
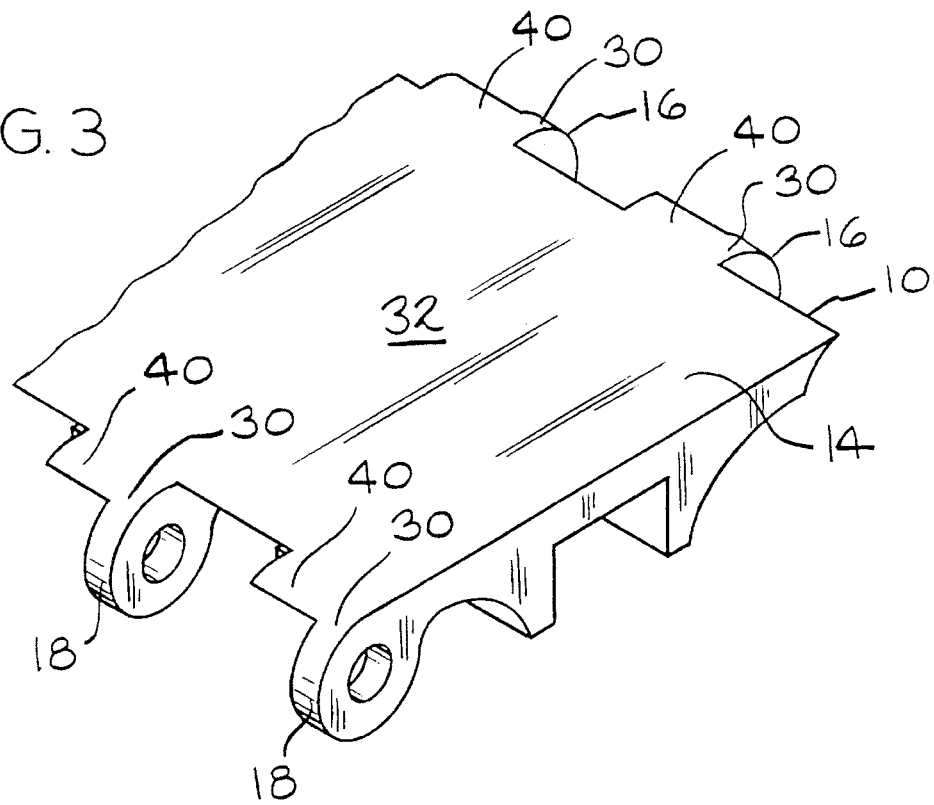
FIG. 3 is a perspective view of a module 10 comprising the belting 12 shown in FIG. 1.
Figure 4:
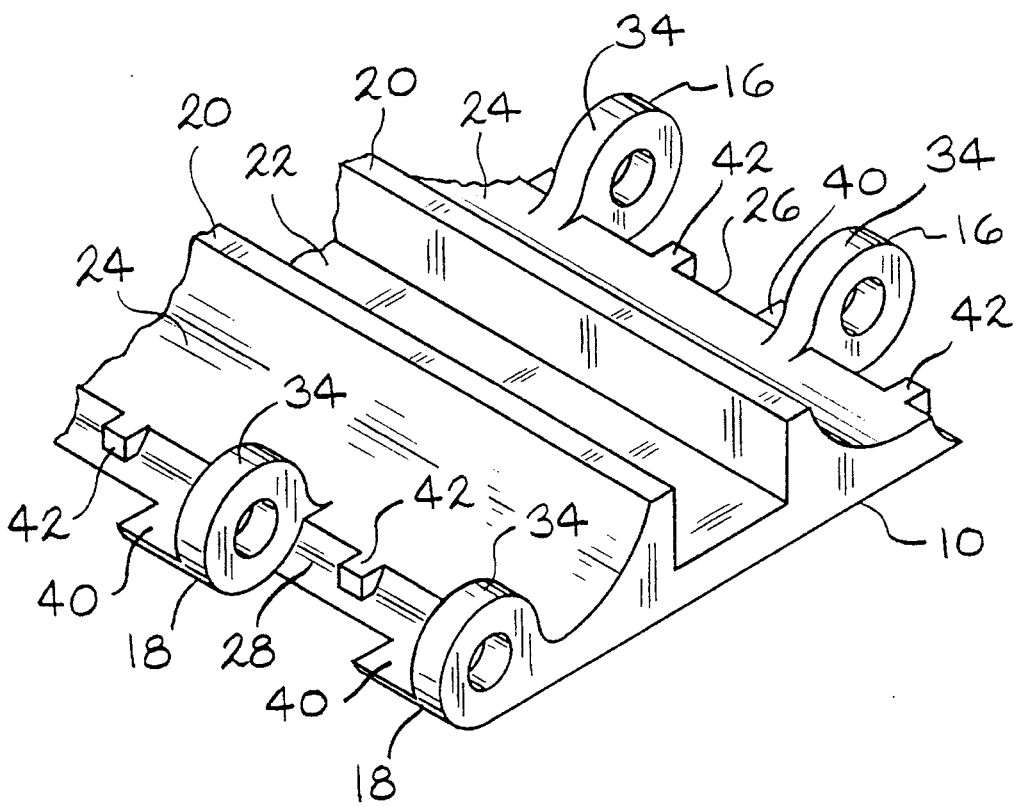
FIG. 4 is an upside down perspective view of the module 10 shown in FIG. 4.

The edges 26 and 28 of a first module which confront the link ends of mated modules are concavely shaped to closely abut the rounded edges of the mated link ends 16 and 18, and to provide only a small gap between the mated links. Overhang portions 40 project outwardly from the junction of the edges 26, 28 and each of their corresponding link ends 16, 18 continuous with the upper surface portions 30 and extending laterally approximately half-way to the adjacent link end. This helps to maintain a substantially continuous conveying surface when mated links are disposed along a straight path, as shown in FIGS. 1 and 2. Tabs 42 extends outwardly from the edges 26, 28, spaced from the adjacent overhang portion 40 a distance sufficient to receive a link end 16, 18 of a mated module therebetween. The tabs 42 prevent lateral movement of the mated modules with respect to each other. Preferably, the modules 10 are of link end configuration to be end-to-end reversible. In other words, either end of a module can mate with either end of any other link module.

The modules 10 are preferably made in widths which are multiples of the smallest module width so that modules can be arranged in a brick-land fashion (not shown) to provide the conveyor belting 12 of any desired overall widths.

Along a straight path, the mated modules 10 each have the upper conveying surface 32 which is substantially coplanar and continuous with that of adjacent links to provide an effectively continuous and easily cleaned conveying surface with only a small parting line between adjacent modules. The pivot rods 38 joining adjacent modules is covered by the overhang portions 40. However, the pivot rod 38 is substantially exposed on the underside of the links, as shown in FIG. 2, to provide visual access to the pivot rods and link ends for inspection and cleaning as required by industrial and governmental regulations, for example, in the food industry. The link ends and edges of each module are also exposed for ease of inspection when the belt 12 is conveying in a circular path around an associated sprocket (not shown), as is well known to those skilled in the art.

Referring now to FIGS. 5 to 8, there is shown another exemplary module 50 according to the present invention. The module 50 is interconnected with like modules to form a modular linked conveyor belting 52. Each module 50 is an integral unitary structure of polymeric material, preferably having the antimicrobial agent incorporated therein, and is formed in an injection molding or other molding process. Each module 50 includes a multiplicity of elongated, parallel, spaced link like elements 54 comprising end sections 56 and 58 joined by connecting section 60 to an intermediate section 62 formed integrally with the connecting sections 60 to form a rigid, generally open structure. The connecting section 60 has a generally rectangular cross-section with a greater depth than width.

Figure 5:
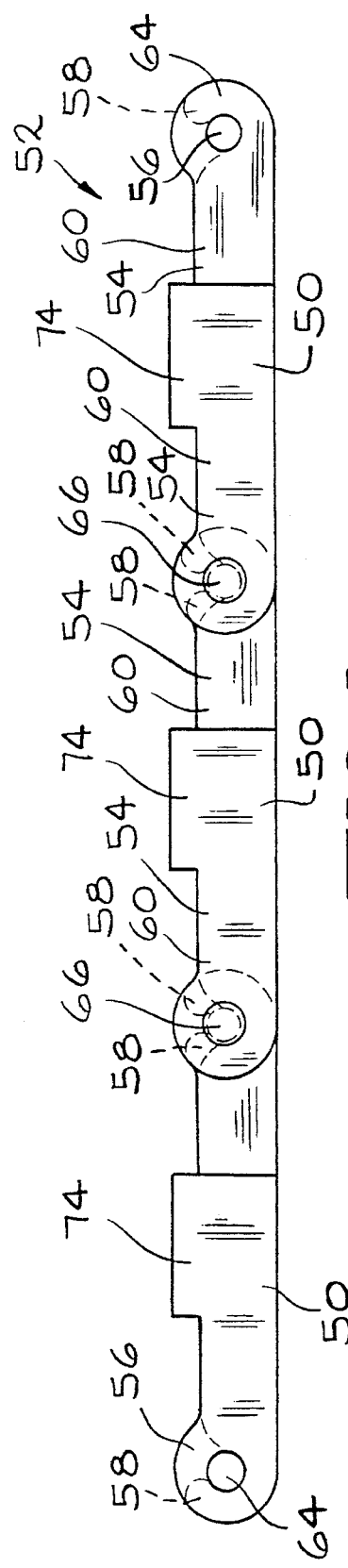
FIG. 5 is an upside down side elevational view of a module conveyor belting 52 constructed according to the present invention.
Figure 6:
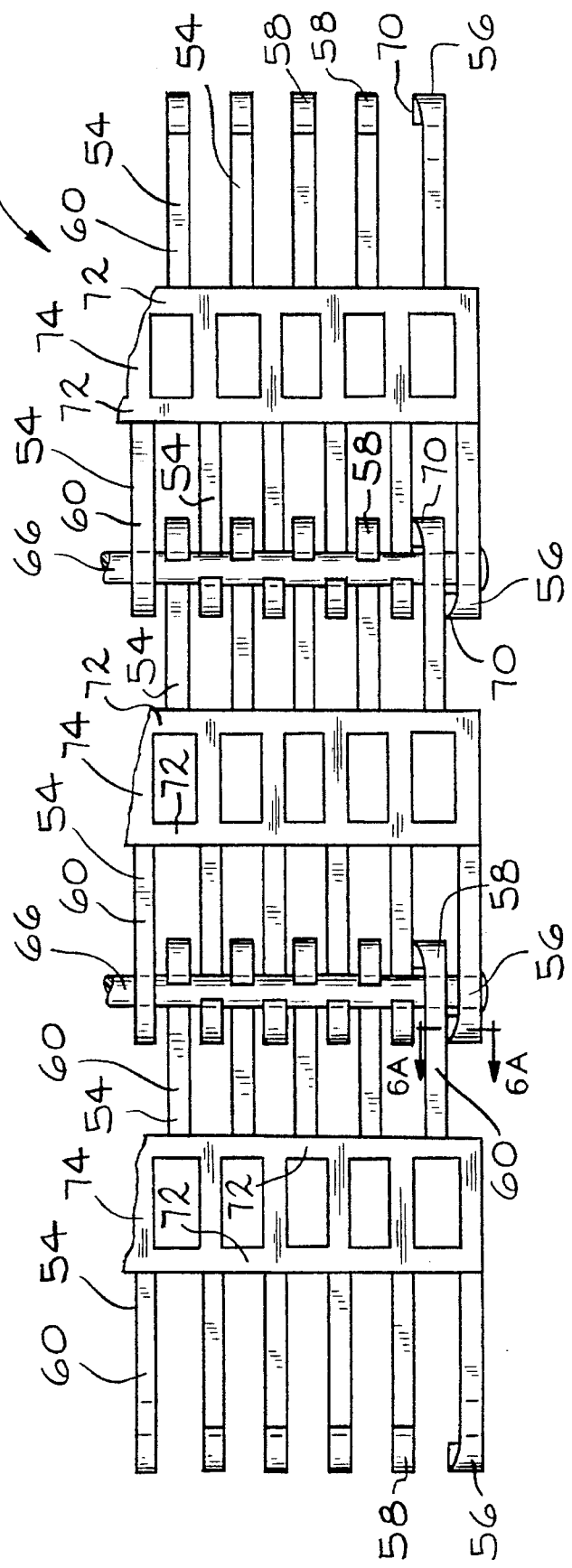
FIG. 6 is an underside plan view of the modular conveyor belting 52 shown in FIG. 5.

End sections 56 when viewed in side elevation, have at least a partially circular cross-section and are formed to surround corresponding ones of aligned holes 64 as an opening for receiving pivot pins or rods 66 (FIGS. 5 and 6). The other end sections 58 when viewed from a similar perspective, also have at least a partially circular cross-section and are formed to provide an inlet 68 as an opening for receiving the rods 66.

Each module includes means for maintaining the lateral position of adjacent modules along the pivotal axis, with the engaged link ends of adjacent link modules being in spaced apart confronting relation. As shown in FIGS. 6, 7 and 8, a boss or spacer 70 is provided on the link end sections 56 of each module 50. While not shown, the boss 70 may also be provided on the link end sections 58. Each boss 70 extends along the direction of the pivotal axis toward the confronting link end by an amount to engage the confronting surface of the link end of an adjacent connected module, which also includes a boss 70 engaging the confronting surface of the link end of the other module. The interconnected modules 50 are thus maintained in intended spaced relationship to expose and provide access to the exposed portions of pivot rod 66 and link ends 56,58.

As shown in FIG. 6, with the pivot rods 66 received in the openings 64 of end sections 56 and the inlets 68 of end sections 58, the modules 50 are connected end-to-end while the bosses 70 laterally align adjacent modules. There is at least one end section 56 with an opening 64 extending from each side of the intermediate section 62 so that when adjacent modules 50 are connected end-to-end, the intermediate rod 66 is captured in the openings 64 of the two connected end sections 56. The remaining link elements 54 can comprise end sections 58 with inlets 68 to provide a substantial space at the inlets for visual inspection of the pivot rod 66 and link ends 56 and 58.

The ends of the intermediate section 62 are coplanar with the outer surface of the link ends 56, 58 at the extreme side of the module 50. The intermediate section 62 preferably comprises a pair of lateral cross members 72 connected by longitudinal extensions 74 to maintain the link like elements in a parallel relation so that the faces of the end sections 56 and 58 remain parallel and the pivot openings 64 and pivot inlets 68 remain aligned to minimize bending stresses across the rods 66. The rods are preferably preformed with a head on one end, the other end of the rod being headed such as by heating after insertion of the rod 66 through the aligned openings 64 and inlets 66 of interconnected modules 50.

The modules 50 are preferably made having end sections with pivot openings 64 spaced apart a distance along the lateral length of the intermediate section 62 in multiples of the smallest module width so that modules can be arranged in a brick-laid fashion (not shown) to provide the conveyor belting 52 of any desired overall width.

The modules 10, 50 are fabricated as an integral unitary structure by injection molding of a polymeric material such as polyethylene. The particular polymeric material used to manufacture the modules 10, 50 is determined in accordance with the characteristics desired to suit a particular operating environment. The pivot rods 38, 66 are typically made of a similar or of a compatible polymeric material as that comprising the modules.

Preferably, an antimicrobial agent is incorporated into the polymeric material from which the various belting components are made. Thus, there is incorporated therein an effective amount of an antimicrobial biocidal or biostatic substance, such as a chlorinated phenoxy. It is further within the scope of the present invention that in use, the module 10,50 having the antimicrobial agent incorporated therein is resistant to growth of fungus, yeast, viruses, and Gram-positive and Gram-negative bacteria including Staph, E coli, Klebsiella and Salmonella. The antimicrobial biocidal or biostatic substance, which is non-toxic, and free of heavy metal, is preferably the chlorinated phenoxy 5-chloro-2-(2, 4-dichlorophenoxy) phenol. An alternative antimicrobial agent is PHMD—polyhexamethlyene biguanide hydrochloride. These compounds are sold by the Microban Products Company, Huntsville, N.C. Other suitable chemical components having known antimicrobial biocidal or biostatic characteristics may also be used in the present invention.

The preferred method of associating the antimicrobial agent with the module 10, 50 is to incorporate it into the synthetic polymeric master batch prior to forming the module 10,50. In that respect, the antimicrobial agent in powder form is added as a component to the mixture comprising the synthetic polymeric material and preferably comprises from between about 0.05 percent to about 2.0 percent, by weight, of the mixture. More preferably, the antimicrobial biocidal or biostatic agent is from between about 0.1 percent to about 1.0 percent, by weight, of the synthetic polymer into which it is incorporated. The resulting synthetic polymeric admixture is injection molded or formed by an other molding process to provide the module 10, 50.

In use, the antimicrobial agent migrates through the polymeric material to the exposed surface thereof from the amorphous zones of the polymer until equilibrium of the antimicrobial agent's internal vapor pressure is reached. If the antimicrobial substance on the surface of the module 10,50 is removed by friction or other means, more antimicrobial agent will move to the surface until the agent's internal vapor pressure is once again at equilibrium. It has been found that the antimicrobial agent incorporated into a belting according to the present invention can withstand temperatures of up to about 350° F. without losing its biocidal and biostatic properties.

Alternatively, the antimicrobial agent can be associated with the module 10, 50 by spraying a topical applicant thereon, or by running the belting 12,52 through a bath comprising the antimicrobial agent.

It is intended that the foregoing description be only illustrative of the present invention and that the present invention be only limited by the hereinafter appended claims.

What is claimed is:

1. A modular conveyor belting having antimicrobial characteristics that inhibit bacterial growth and promote asepsis on the belting, which comprises:
    a) a plurality of like modules, each module comprised of a polymeric material and including a first plurality of link ends, a second plurality of link ends and an intermediate section integrally formed with and joining the first and second plurality of link ends, wherein the link ends of each of the modules are releasably engaged between link ends of an adjacent module except for individual link ends disposed at the extreme sides of the module;
    b) a pivot rod for pivotally connecting the modules at engaged link ends, wherein the link ends of each of the modules are of a width somewhat less than the spacing between confronting link ends along the pivotal axis thereof to provide for the pivotal connection of the modules; and
    c) an antimicrobial agent associated with the modules, wherein the antimicrobial agent is provided as a topical applicant applied to an exposed surface of the module or is incorporated into the polymeric material thereof, wherein the antimicrobial agent is selected from the group consisting of a chlorinated phenoxy and polyhexamethylene biguanide hydrochloride, and wherein when the antimicrobial agent is incorporated into the polymeric material comprising the modules, the antimicrobial agent exhibits controlled migration through the polymeric material to the exposed surface thereof when an imbalance of vapor pressure of the antimicrobial agent demands equalization to thereby continuously inhibit bacterial growth and promote asepsis on the belting.

2. The conveyor belting of claim 1 wherein the chlorinated phenoxy is 5-chloro-2-(2,4-dichlorophenoxy) phenol.

3. The conveyor belting of claim 1 wherein the antimicrobial agent is present in the polymeric material in an amount of between about 0.05 percent to about 2.0 percent, by weight.

4. The conveyor belting of claim 1 wherein the plurality of first link ends and second link ends of each module are provided with an opening aligned along respective first and second pivot axes for receiving the pivot rod for pivotally connecting the modules at the engaged link ends.

5. The conveyor belting of claim 1 wherein at least one of the first and second plurality of link ends completely surround the opening aligned along the first and second pivot axes, the remaining link ends having an inlet to receive the pivot rod aligned along the respective first and second pivot axes.

6. The conveyor belting of claim 1 wherein interconnected modules disposed along a straight path define an effectively continuous conveying surface.

7. The conveyor belting of claim 6 wherein the conveying surface is a surface of a plate-like portion of an integral body.

8. The conveyor belting of claim 1 including a lateral aligning means positioned between at least one pair of confronting link ends along each pivot rod, wherein the lateral aligning means extends along the direction of the pivotal axis and in engagement with a confronting surface of the link end of a connected module to maintain a spaced confronting relation between the other connected link ends for exposure of the interconnecting pivot rod.

9. The conveyor belting of claim 8 wherein the lateral aligning means comprises a boss on at least one link end of each the plurality of link ends of the module.

10. The conveyor belting of claim 8 wherein the lateral aligning means comprises a tab means extending from each opposed edge of the module for engagement with the confronting surface of the link end of a connected module to thereby maintain the spaced confronting relation between the other connected link ends of the connected module.

11. A method of manufacturing a modular conveyor belting having antimicrobial characteristics that inhibit bacterial growth and promote asepsis on the belting, which comprises:

a) providing a plurality of like modules, each comprising a polymeric material and including a first plurality of link ends, a second plurality of link ends and an intermediate section integrally formed with and joining the first and second plurality of link ends, wherein the link ends of each of the modules are releasably engaged between link ends of an adjacent module except for individual link ends disposed at the extreme sides of the module;

b) providing a pivot rod for pivotally connecting the modules at engaged link ends, wherein the link ends of each of the modules are of a width somewhat less than the spacing between confronting link ends along the pivotal axis thereof to provide for the pivotal connection of the modules;

c) associating an antimicrobial agent with the modules by applying the antimicrobial agent to the modules as a topical applicant to an exposed surface thereof or by incorporating the antimicrobial agent into the polymeric material thereof;

d) selecting the antimicrobial agent from the group consisting of a chlorinated phenoxy and polyhexamethylene biguanide hydrochloride, wherein when the antimicrobial agent is incorporated into the polymeric material, the antimicrobial agent exhibits controlled migration through the polymeric material comprising the modules to the exposed surface thereof when an imbalance of vapor pressure of the antimicrobial agent demands equalization thereby continuously inhibiting bacterial growth and promoting asepsis on the belting.

12. The method of claim 11 wherein the chlorinated phenoxy is 5-chloro-2-(2,4-dichlorophenoxy) phenol.

13. The method of claim 11 wherein the antimicrobial agent is present in the polymeric material in an amount of between about 0.05 percent to about 2.0 percent, by weight.

* * * * *